US012673503B2

(12) United States Patent
Inui et al.

(10) Patent No.: US 12,673,503 B2
(45) Date of Patent: Jul. 7, 2026

(54) LIQUID SUPPLY MECHANISM AND INKJET RECORDING APPARATUS INCLUDING SAME

(71) Applicant: KYOCERA Document Solutions Inc., Osaka (JP)

(72) Inventors: Yasutaka Inui, Osaka (JP); Shuhei Kawamata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 240 days.

(21) Appl. No.: 18/741,046

(22) Filed: Jun. 12, 2024

(65) Prior Publication Data

US 2024/0416658 A1 Dec. 19, 2024

(30) Foreign Application Priority Data

Jun. 14, 2023 (JP) ................................ 2023-097876

(51) Int. Cl.

| | |
|---|---|
| ***B41J 2/175*** | (2006.01) |
| ***B41J 2/165*** | (2006.01) |
| ***B41J 2/18*** | (2006.01) |

(52) U.S. Cl.

CPC ....... *B41J 2/17596* (2013.01); *B41J 2/16552* (2013.01); *B41J 2/17563* (2013.01); *B41J 2/18* (2013.01); *B41J 2002/16558* (2013.01); *B41J 2002/16594* (2013.01); *B41J 2/175* (2013.01)

(58) Field of Classification Search

CPC ......................... B41J 2/16552; B41J 2/17563; B41J 2/17596; B41J 2/18; B41J 2/175; B41J 2002/16558; B41J 2002/16594; F15B 2211/30505; F15B 13/027; F15B 2211/6052

See application file for complete search history.

(56) References Cited

U.S. PATENT DOCUMENTS

2012/0026255 A1* 2/2012 Park ......................... B41J 2/175
347/85

FOREIGN PATENT DOCUMENTS

JP S 60-090768 A 5/1985

* cited by examiner

*Primary Examiner* — Geoffrey S Mruk
(74) *Attorney, Agent, or Firm* — Stein IP, LLC

(57) ABSTRACT

A liquid supply mechanism includes a tank configured to store liquid, a supply passage having an end connected to the tank so as to allow the liquid to flow, and an ejection member disposed on the supply passage so as to eject the liquid. The ejection member includes a filter, a check valve, and an ejection passage. The filter has a predetermined passage resistance to the passing liquid. The check valve is opened at a predetermined opening pressure for the passing liquid. The ejection passage allows the liquid to flow when the check valve is opened and ejects the liquid from an ejection port formed at a tip thereof. A pressure decompressed by the passage resistance of the filter is larger than the opening pressure of the check valve.

8 Claims, 12 Drawing Sheets

LIQUID SUPPLY MECHANISM AND INKJET RECORDING APPARATUS INCLUDING SAME

INCORPORATION BY REFERENCE

This application is based upon and claims the benefit of priority from the corresponding Japanese Patent Application No. 2023-097876 filed Jun. 14, 2023, the entire contents of which are hereby incorporated by reference.

BACKGROUND

The present disclosure relates to a liquid supply mechanism and an inkjet recording apparatus including the same.

A conventional liquid supply mechanism includes a tank that stores liquid, a supply passage (tube) having an end connected to the tank so as to allow the liquid to flow, an ejection member (head) that ejects the liquid supplied from the supply passage, and a check valve. The check valve is opened at a predetermined opening pressure for bubbles accumulated in the supply passage.

When using the conventional technique, if the supply passage is branched into a plurality of supply passages, pressures of the liquid flowing in the branched supply passages vary. Therefore, if the ejection member is disposed on each of the branched supply passages, there is a problem that pressures of the liquid ejected from the individual ejection members have variations.

It is an object of the present disclosure to provide a liquid supply mechanism that can equalize pressures of liquid ejected from ejection members, and an inkjet recording apparatus including the same.

SUMMARY

A liquid supply mechanism according to an aspect of the present disclosure includes a tank configured to store liquid, a supply passage having an end connected to the tank so as to allow the liquid to flow, and an ejection member disposed on the supply passage so as to eject the liquid. The ejection member includes a filter, a check valve, and an ejection passage. The filter has a predetermined passage resistance to the passing liquid. The check valve is opened at a predetermined opening pressure for the passing liquid. The ejection passage allows the liquid to flow when the check valve is opened and ejects the liquid from an ejection port formed at a tip thereof. A pressure decompressed by the passage resistance of the filter is larger than the opening pressure of the check valve.

Other objects of the present disclosure and specific advantages obtained by the present disclosure will become more apparent from the description of the embodiment given below.

DETAILED DESCRIPTION

[1. Structure of Inkjet Recording Apparatus]

Figure 1:
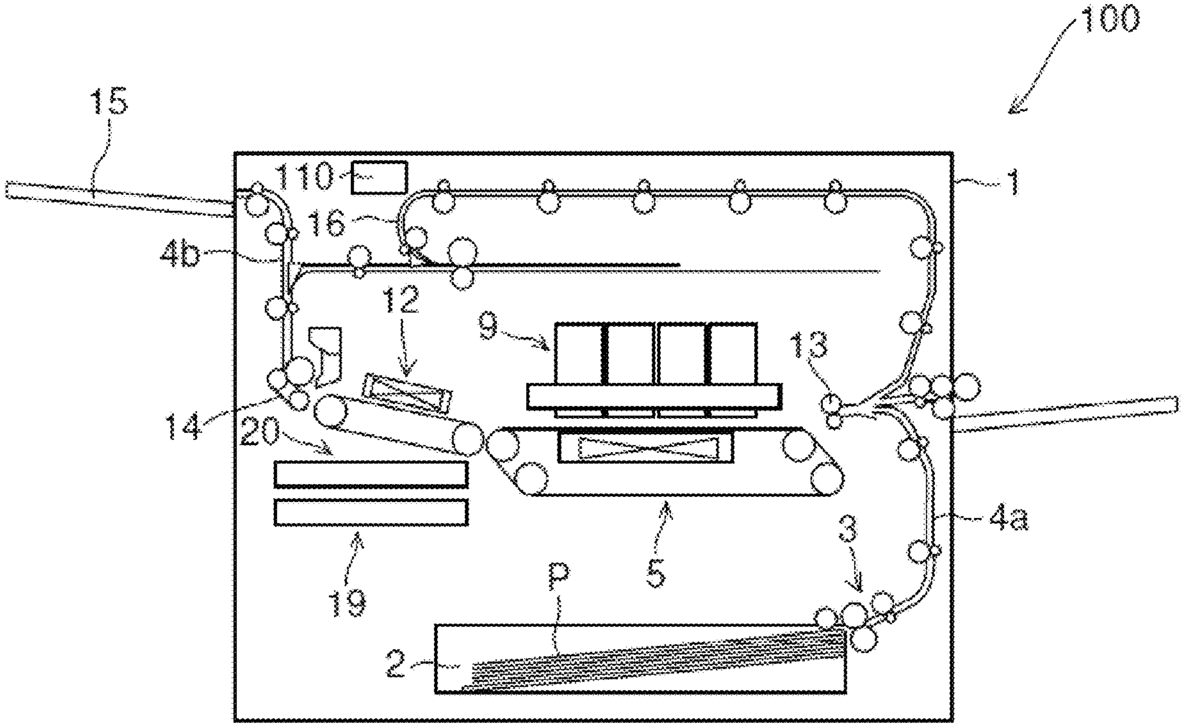
FIG. 1 is an explanatory diagram illustrating a schematic structure of a printer as an inkjet recording apparatus according to an embodiment of the present disclosure.

Hereinafter, with reference to the drawings, an embodiment of the present disclosure is described. FIG. 1 is an explanatory diagram illustrating a schematic structure of a printer 100 as an inkjet recording apparatus according to an embodiment of the present disclosure. The printer 100 includes a sheet feed cassette 2 as a paper sheet storage unit. The sheet feed cassette 2 is disposed in a lower part inside a printer main body 1. Paper sheets P as an example of recording media are stored in the sheet feed cassette 2.

On a downstream side in a paper sheet conveying direction of the sheet feed cassette 2, i.e., above the right side of the sheet feed cassette 2 in FIG. 1, a sheet feeding device 3 is disposed. By this sheet feeding device 3, the paper sheet P is separated one by one and is sent out in an upper right direction from the sheet feed cassette 2 in FIG. 1.

The printer 100 includes a first paper sheet conveying path 4*a* inside it. The first paper sheet conveying path 4*a* is disposed on an upper right side of the sheet feed cassette 2, in the sheet feeding direction. The paper sheet P sent out from the sheet feed cassette 2 is conveyed in the first paper sheet conveying path 4*a* upward vertically along a side surface of the printer main body 1.

On a downstream end of the first paper sheet conveying path 4*a* in the paper sheet conveying direction, a registration roller pair 13 is disposed. Further, just close to the downstream side of the registration roller pair 13 in the paper sheet conveying direction, a first conveying unit 5 and a recording unit 9 are disposed. The paper sheet P sent out from the sheet feed cassette 2 passes through the first paper sheet conveying path 4*a* and reaches the registration roller pair 13. The registration roller pair 13 corrects a skew of the paper sheet P, and sends out the paper sheet P to the first conveying unit 5 (particularly, a conveyor belt 8 described later), in synchronization with timing of an ink ejection operation performed by the recording unit 9.

The paper sheet P sent out by the registration roller pair 13 to the first conveying unit 5 is conveyed by the conveyor belt 8 to a position facing the recording unit 9 (particularly, recording heads 17*a* to 17*c* described later). When the recording unit 9 ejects ink to the paper sheet P, an image is recorded on the paper sheet P. At this time, the ejection of ink from the recording unit 9 is controlled by a control unit 110 in the printer 100.

A second conveying unit 12 is disposed on the downstream side of the first conveying unit 5 in the paper sheet conveying direction (on the left side in FIG. 1). The paper sheet P with an image recorded by the recording unit 9 is sent to the second conveying unit 12. The ink ejected onto a surface of the paper sheet P is dried while passing through the second conveying unit 12.

A decurler unit 14 is disposed on the downstream side of the second conveying unit 12 in the paper sheet conveying direction, in a vicinity of the left side surface of the printer main body 1. The paper sheet P after the ink is dried by the second conveying unit 12 is sent to the decurler unit 14, in which a curl generated in the paper sheet P is corrected.

A second paper sheet conveying path **4*b* is disposed on the downstream side of the decurler unit 14 in the paper sheet conveying direction (on the upper side in FIG. 1). The paper sheet P after passing through the decurler unit 14 passes through the second paper sheet conveying path 4*b*, and is discharged onto a paper sheet discharge tray 15 disposed outside of the left side surface of the printer 100**, in the case where the double-sided recording is not performed.

A reverse conveying path 16 for performing the double-sided recording is disposed in an upper part of the printer main body 1, above the recording unit 9 and the second conveying unit 12. When performing the double-sided recording, the paper sheet P, which is after printing on one side (first side) of the paper sheet P and after passing through the second conveying unit 12 and the decurler unit 14, passes through the second paper sheet conveying path **4*b* and is sent to the reverse conveying path 16**.

The paper sheet P sent to the reverse conveying path 16 is changed in its conveying direction for a purpose of recording on the other side (second side) of the paper sheet P. Then, the paper sheet P passes in the upper part of the printer main body 1 to be sent to the right side, and is sent to the first conveying unit 5 again via the registration roller pair 13, in the state where the second side faces upward. In the first conveying unit 5, the paper sheet P is conveyed to the position facing the recording unit 9, and an image is recorded on the second side by ink ejection from the recording unit 9. The paper sheet P after the double-sided recording passes through the second conveying unit 12, the decurler unit 14, and the second paper sheet conveying path **4*b* in order, and is discharged onto the paper sheet discharge tray 15**.

In addition, a maintenance unit 19 and a cap unit 20 are disposed below the second conveying unit 12. The maintenance unit 19 horizontally moves to below the recording unit 9 when performing purge, so as to wipe off the ink pushed out from nozzles **18*a* (see FIG. 2) of the recording heads 17*a* to 17*c*, and to collect the wiped ink. Note that the "purge" means an operation of forcibly pushing out ink from the nozzles 18*a* of the recording heads 17*a* to 17*c*, so as to discharge thickened ink, foreign objects, bubbles, and the like in the nozzles 18*a***.

When the cap unit 20 caps the ink ejection surfaces of the recording heads **17*a* to 17*c*, it horizontally moves to below the recording unit 9, and further moves upward so as to be attached to the lower surfaces of the recording heads 17*a* to 17*c***.

Figure 2:
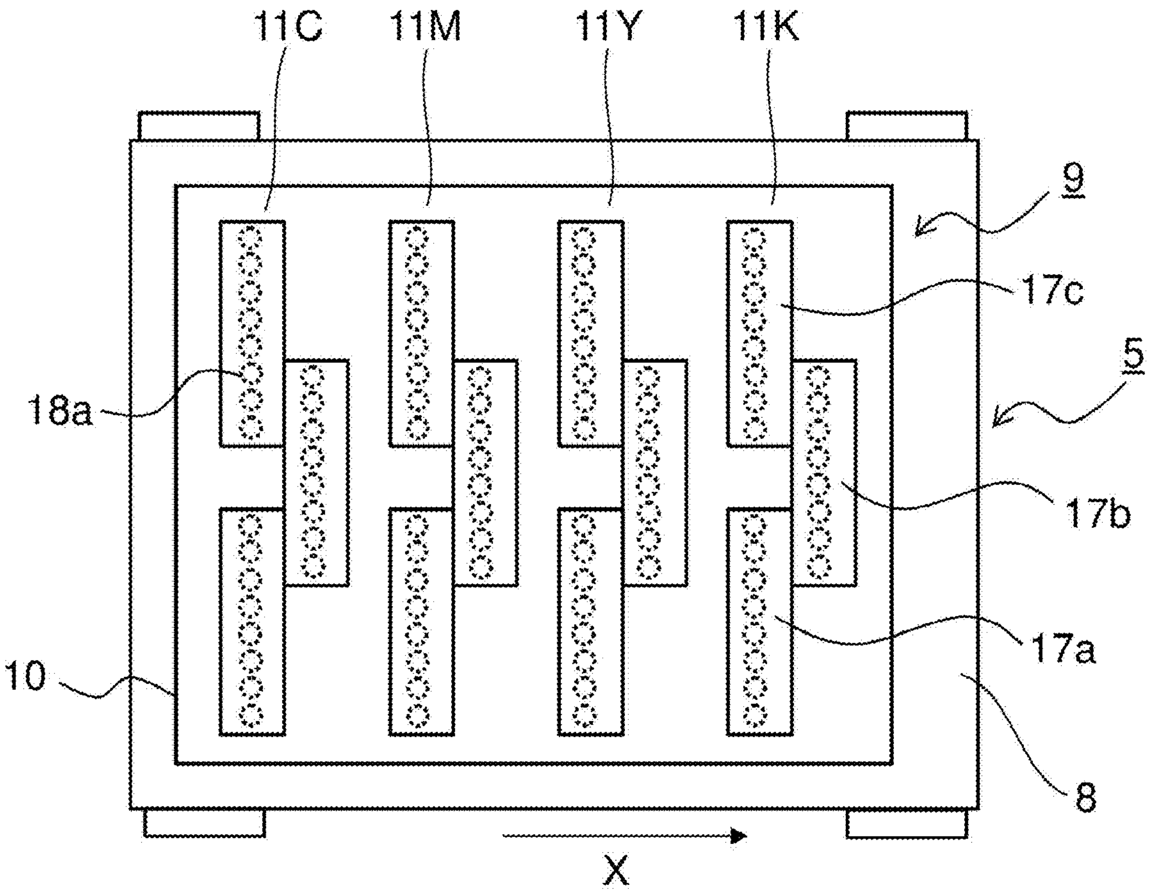
FIG. 2 is a plan view of a recording unit of the printer according to the embodiment.

FIG. 2 is the diagram of the recording unit 9 of the printer 100 viewed from above. The recording unit 9 includes a head housing 10, and line heads 11C, 11M, 11Y, and 11K held by the head housing 10. These line heads 11C to 11K are supported at such a height that a predetermined clearance (e.g., 1 mm) is formed between a conveying surface of the conveyor belt 8 and them. As illustrated in FIG. 2, a plurality of (e.g., three) recording heads **17*a* to 17*c* are arranged in zigzag along a width direction of the paper sheet (vertical direction in FIG. 2) perpendicular to the paper sheet conveying direction (arrow X direction). Note that the three recording heads 17*a* to 17*c*** of individual colors have the same shape and the same structure, and hence the suffix (a, b, or c) is omitted in the following description.

Figure 3:
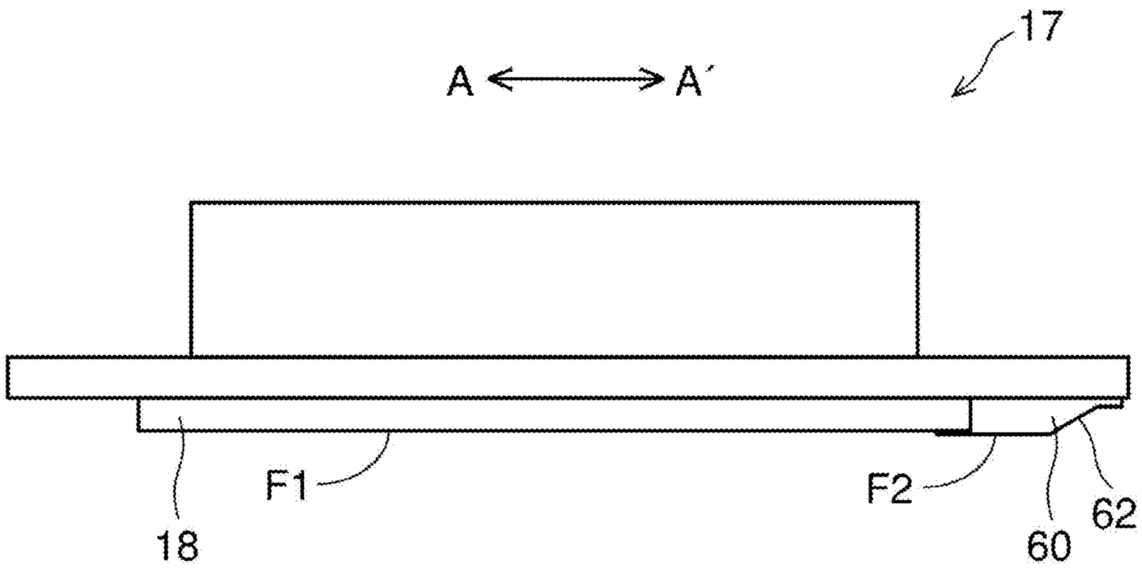
FIG. 3 is a side view of a recording head constituting a line head of the recording unit.
Figure 4:
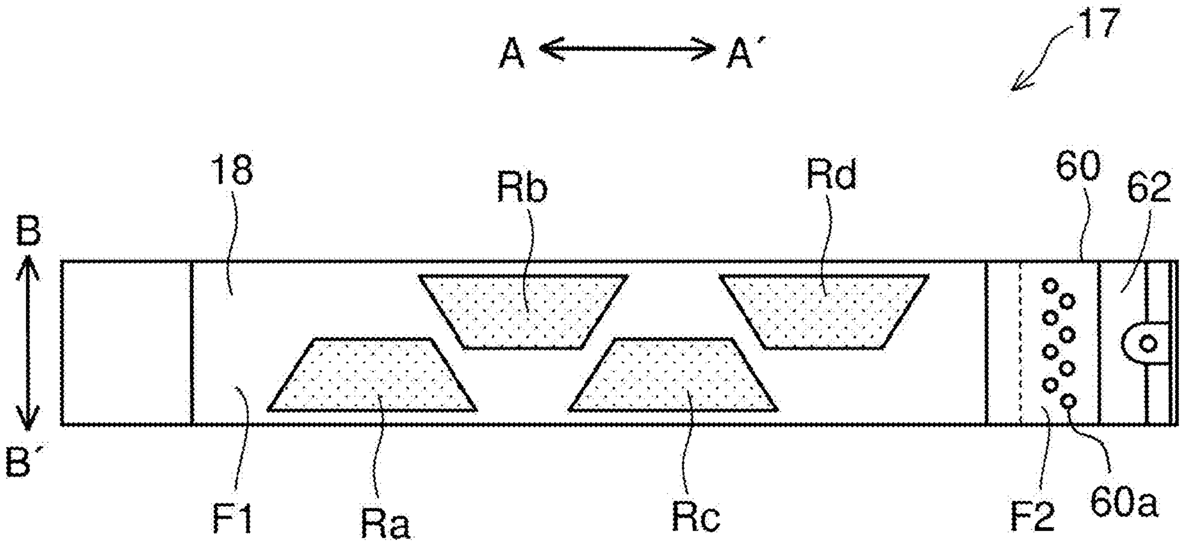
FIG. 4 is a plan view of the recording head viewed from an ink ejection surface side.

FIG. 3 is a side view of the recording head 17 constituting the line heads 11C to 11K of the recording unit 9, and FIG. 4 is a plan view of the recording head 17 viewed from a ink ejection surface F1 side.

As illustrated in FIGS. 3 and 4, the ink ejection surface (nozzle surface) F1 of a head part 18 of the recording head 17 is provided with a plurality of (e.g. four) nozzle regions Ra to Rd, in each of which many nozzles **18*a* (see FIG. 2) are arranged. At least the ink ejection surface F1 of the head part 18 is made of stainless steel (SUS), for example. The ink ejection surface F1** is water-repellent finished by applying fluorine or silicone water repellent.

The recording heads 17 constituting the line heads 11C to 11K are supplied with ink of four colors (cyan, magenta, yellow, and black colors), respectively for individual colors of the line heads 11C to 11K, the ink of individual colors being stored in ink tanks (not shown), respectively.

Each of the recording heads 17 ejects ink from the nozzles **18*a* to the paper sheet P, which is conveyed by the conveying surface of the conveyor belt 8 while being sucked and held by the same, in accordance with image data received from an external computer, on the basis of a control signal from the control unit 110 (see FIG. 1). In this way, the ink of four colors, i.e., the cyan, magenta, yellow, and black colors are overlaid and a color image is formed on the paper sheet P on the conveyor belt 8. In addition, the recording head 17 is provided with a cleaning liquid supply member 60** that supplies cleaning liquid for inkjet recording head (hereinafter, simply referred to as cleaning liquid).

Figure 5:
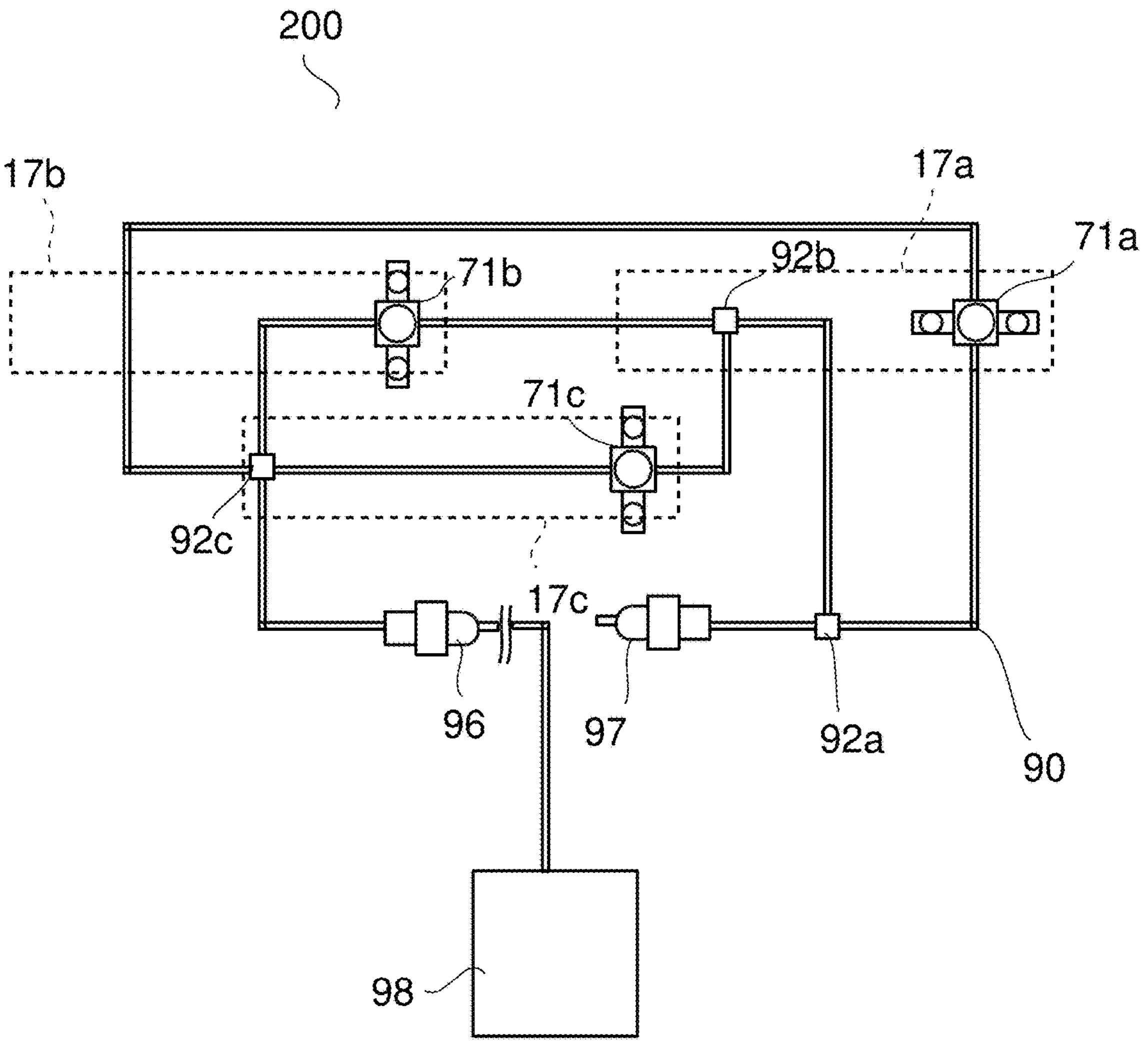
FIG. 5 is an explanatory diagram illustrating a liquid supply mechanism.

FIG. 5 is an explanatory diagram illustrating a liquid supply mechanism 200. The liquid supply mechanism 200 includes a tank 98 that stores cleaning liquid (liquid), a supply passage 90 made of a tube having an end connected to the tank 98 so as to allow the cleaning liquid to flow, ejection members **71*a* to 71*c* disposed on the supply passage 90 so as to eject the cleaning liquid, and a pump (not shown). The ejection members 71*a* to 71*c* are connected to the cleaning liquid supply member 60**.

In this embodiment, the supply passage 90 has an end provided with a supply connection part 97 and the other end provided with a discharge connection part 96. The supply connection part 97 is connected to an output side of the pump (not shown). An input side of the pump is connected to the tank 98. The pump applies a force that allows the cleaning liquid to move in the supply passage 90 and pushes out the cleaning liquid from a cleaning liquid supply port **60*a*. In other words, both ends of the supply passage 90 are connected to the pump via the tank 98**, the pump allowing the cleaning liquid (liquid) circulates. In this embodiment, one pump is disposed in each liquid passage. In other words, one pump is disposed for each color. Note that, the pump is an example of a drive unit.

In addition, in this embodiment, passage lengths from the supply connection part 97 to the ejection members **71*a* to 71*c* of three recording head 17*a*, 17*b*, 17*c* of the same color are different to each other. Specifically, the supply passage 90 extending from the supply connection part 97 branches at a branch part 92***a*. One of the supply passages 90 branched at the branch part 92*a* is connected to the ejection member 71*a*. In addition, the other supply passage 90 branched at the branch part 92*a* further branches at a branch part 92*b*. One of the supply passages 90 branched at the branch part 92*b* is connected to the ejection member 71*b*. In addition, the other supply passage 90 branched at the branch part 92*b* is connected to the ejection member 71*c*.

In addition, the supply passage 90 passing through the ejection members 71*a* to 71*c* join at a branch part 92*c* so as to be connected to the discharge connection part 96. In this embodiment, the discharge connection part 96 is connected to an on-off valve (not shown), which can allow the cleaning liquid flowing in the supply passage 90 to stop or pass. In other words, there is further provided the on-off valve that can open and close the supply passages 90 of the liquid on the downstream side of the ejection members 71*a* to 71*c*. In addition, in this embodiment, the plurality of supply passages 90 after being branched join at the branch part (confluence part) 92*c* on the downstream side of the ejection members, and the on-off valve (not shown) is disposed on the downstream side of the branch part (confluence part) 92*c* of the supply passages 90. By disposing the on-off valve on the downstream side of the branch part (confluence part) 92*c* of the supply passages 90, pressures of the cleaning liquid ejected from the ejection members 71*a* to 71*c* can be equalized by controlling the single on-off valve, and hence production cost of the printer 100 can be reduced. Note that it may be possible to dispose the on-off valve on the downstream side of each of the ejection members 71*a* to 71*c*, on the upstream side of the branch part (confluence part) 92*c*.

In this embodiment, the supply passage 90 is branched a plurality of times, and the passage lengths from the pump (not shown) to the ejection members 71*a* to 71*c* are different to each other, and hence the pressures of the cleaning liquid at the ejection members 71*a* to 71*c* are different to each other. Therefore, the pressures of the cleaning liquid ejected from the ejection members 71*a* to 71*c* may have variations. To solve this problem, the ejection members 71*a* to 71*c* have the following structure, so that pushed-out amounts of the cleaning liquid at the ejection members 71*a* to 71*c* can be equalized.

Figure 6:
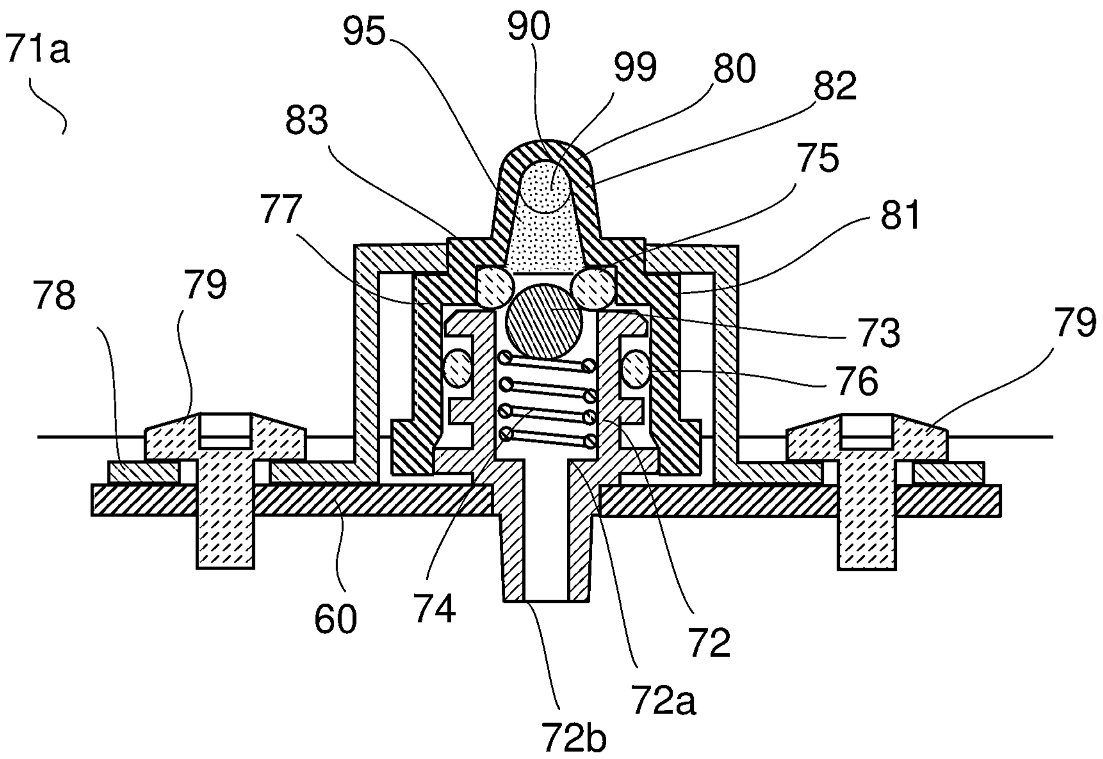
FIG. 6 is a longitudinal cross-sectional view of an ejection member and its vicinity of the liquid supply mechanism.

FIG. 6 is a cross-sectional side view of the ejection member 71*a* and its vicinity. Note that the ejection member 71*a* is exemplified in the following description, but the ejection members 71*b* and 71*c* have the same basic structure as the ejection member 71*a*, and hence descriptions thereof are omitted.

The ejection member 71*a* includes a cap 80, a filter 99, a cylindrical part 72, a biasing spring 74, and a check valve 73. The inside diameter of an upper part of the cylindrical part 72 is larger than the inside diameter of a lower part of the cylindrical part 72. The biasing spring 74 and the check valve 73 are disposed in the upper part of the cylindrical part 72. The check valve 73 is a spherical member having a diameter smaller than the inside diameter of the upper part of the cylindrical part 72.

The outside diameter of the biasing spring 74 is smaller than the inside diameter of the upper part of the cylindrical part 72, and is larger than the inside diameter of the lower part of the cylindrical part 72. In addition, the biasing spring 74 is disposed between the check valve 73 and a step part 72*a* formed on the inner wall of the cylindrical part 72.

The cap 80 is attached to the outside of the cylindrical part 72. The cap 80 includes a large diameter cylindrical part 81, a small diameter cylindrical part 82, and a connecting part 83, which are disposed coaxially with the cylindrical part 72. The cylindrical part 72 is disposed inside the inner surface of the large diameter cylindrical part 81 with an O-ring 76 between them. An upper end surface of the small diameter cylindrical part 82 is closed, and an upper part of the small diameter cylindrical part 82 communicates to the supply passage 90. The connecting part 83 is formed in a ring shape so as to connect an upper end of the large diameter cylindrical part 81 and a lower end of the small diameter cylindrical part 82. The connecting part 83 has an inside diameter that decreases toward the upper side. An O-ring 75 is disposed on the inside surface of the connecting part 83.

The cap 80 is covered with a plate-like holding member 78, and both sides of the holding member 78 is fastened to the cleaning liquid supply member 60 with screws 79.

The inside of the small diameter cylindrical part 82 of the cap 80 and the cylindrical part 72 communicates to the supply passage 90 so as to form an ejection passage 95. The cleaning liquid flowing in the supply passage 90 passes through the ejection passage 95 and is supplied to an ejection port 72*b* formed in a lower end part of the cylindrical part 72.

The filter 99 is disposed between the supply passage 90 and the check valve 73 in the ejection passage 95, and has a predetermined passage resistance to the cleaning liquid. In this way, the pressure of the cleaning liquid, which has passed through the supply passage 90 and entered the ejection passage 95, is decompressed when passing through the filter 99, and flows again on the downstream side of the ejection member 71*a*.

The check valve 73 is biased by the biasing spring 74 in the direction toward the supply passage 90, and contacts the connecting part 83 via the O-ring 75. In this way, the ejection passage 95 on the supply passage 90 side is closed by the check valve 73. In this case, when the pressure of the cleaning liquid decompressed by the filter 99 exceeds a predetermined opening pressure, the check valve 73 separates from the O-ring 75 against the pressing force of the biasing spring 74. In this way, the check valve 73 is opened, and the cleaning liquid passes through the ejection passage 95 and is ejected from the ejection port 72*b*.

In this case, the pressure decompressed by the passage resistance of the filter 99 is larger than the opening pressure of the check valve 73. The pressure of the cleaning liquid (liquid) that passes each of the ejection members 71*a* to 71*c* is decompressed by the filter 99 to be a predetermined pressure. In this way, even if the pressure of the cleaning liquid passing through the supply passages 90 is different among the ejection members 71*a* to 71*c*, the filter 99 decompresses the pressure, and hence the check valve 73 is not opened. On the other hand, when the on-off valve (not shown) is closed, the pressure of the cleaning liquid flowing in each of the branched supply passages 90 increases. When the pressure of the cleaning liquid reaches a predetermined value, the check valve 73 is opened, and the cleaning liquid is ejected from each ejection port 72*b*.

In this way, until the pressures of the ejection members 71*a* to 71*c* are increased to the predetermined pressure or more, the pressures of the cleaning liquid passing through the ejection members 71*a* to 71*c* are equalized. Therefore, the pressures of the cleaning liquid ejected from the ejection members 71*a* to 71*c* when the check valves 73 are opened can be equalized. In this way, the pushed-out amounts of the cleaning liquid at the ejection members 71*a* to 71*c* can be equalized. In addition, by providing the check valve 73 to each of the ejection members 71*a* to 71*c*, it is possible to prevent the cleaning liquid from flowing out from the ejection members 71*a* to 71*c* due to water head difference. In addition, it is possible to prevent bubbles from being stuck in the supply passage 90 from the ejection port 72*b*.

Note that it is preferred that the pressure decompressed by the passage resistance of the filter 99 is three times or more the opening pressure of the check valve 73. In this way, the pressure of the cleaning liquid (liquid) passing through the ejection members 71*a* to 71*c* is decompressed by the filter 99 to be a predetermined pressure or less. Therefore, the pushed-out amounts of the cleaning liquid at the ejection members 71*a* to 71*c* can be equalized more.

In addition, it is preferred to set the opening pressure of the check valve 73 of the ejection member 71*a*, to be higher than the pressure decompressed by the passage resistance in the supply passage 90, from the downstream of the ejection member 71*a* to the tank 98. In addition, it is preferred to set the sum of the passage resistances until reaching the ejection port 72*b* in the ejection passage 95, which includes the pressure decompressed by the passage resistance of the filter 99 and the opening pressure of the check valve 73, to be twice or more the passage resistance of the supply passage 90 from the downstream of the ejection member 71*a* to the tank 98. In this way, the pressure of the liquid ejected from the ejection members 71*a* when the check valves 73 are opened can be equalized more.

In the same manner, the opening pressure of the check valve 73 of the ejection member 71*b* is set higher than the pressure decompressed by the passage resistance of the supply passage 90 from the downstream of the ejection member 71*b* to the tank 98, and the sum of the passage resistances until reaching the ejection port 72*b* in the ejection passage 95, which includes the pressure decompressed by the passage resistance of the filter 99 and the opening pressure of the check valve 73, is twice or more the passage resistance of the supply passage 90 from the downstream of the ejection member 71*b* to the tank 98.

In addition, the opening pressure of the check valve 73 of the ejection member 71*c* is set higher than the pressure decompressed by the passage resistance of the supply passage 90 from the downstream of the ejection member 71*c* to the tank 98, and the sum of the passage resistances until reaching the ejection port 72*b* in the ejection passage 95, which includes the pressure decompressed by the passage resistance of the filter 99 and the opening pressure of the check valve 73, is twice or more the passage resistance of the supply passage 90 from the downstream of the ejection member 71*c* to the tank 98.

Figure 7:
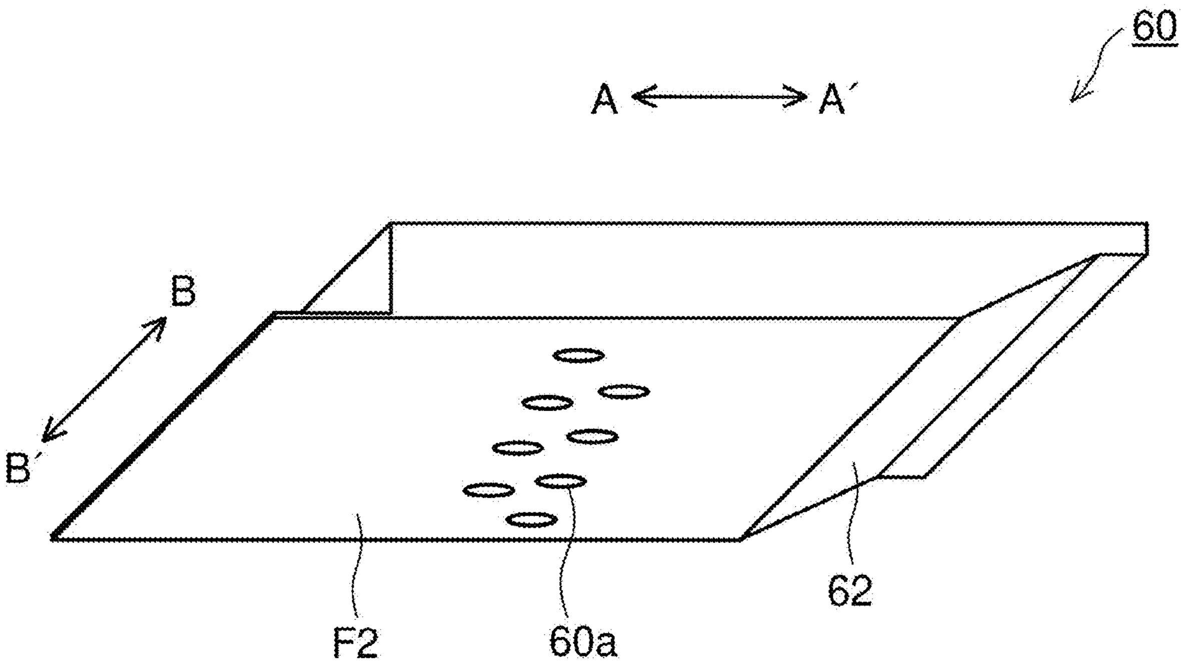
FIG. 7 is a perspective view of a cleaning liquid supply member viewed from below diagonally.

As illustrated in FIG. 7, an inclined surface 62 is formed at a part of the cleaning liquid supply member 60, on the upstream side (the right side in FIG. 7) of a cleaning liquid supply surface F2 in a wiping direction (arrow A direction). A part of the cleaning liquid supply surface F2 on the downstream side (the left side in FIG. 7) in the wiping direction is formed as a thin plate, and is disposed to overlap an end part of the ink ejection surface F1 of the head part 18.

The cleaning liquid supply port 60*a* is disposed on the cleaning liquid supply surface F2 of the cleaning liquid supply member 60. The cleaning liquid supply port 60*a* communicates to the ejection port 72*b*. A plurality of the cleaning liquid supply ports 60*a* may be arranged in zigzag in the wiping direction (the arrow A direction), and in the head width direction (an arrow BB' direction) perpendicular to the wiping direction, at a predetermined pitch. By arranging in this way, the cleaning liquid can be supplied over the head width direction.

[2. Recovery Operation of Recording Head]

Next, a recovery operation of the recording head 17 in the printer 100 is described. In the printer 100, for a purpose of cleaning the ink ejection surface F1 of the recording head 17, the recovery operation of all the recording heads 17 is performed when printing is started after a long period of stop, and between printing operations, as preparation for the next printing operation.

When performing the recovery operation of the recording head 17, the first conveying unit 5 disposed to face a lower surface of the recording unit 9 is moved downward. Then, a unit moving mechanism (not shown) moves the maintenance unit 19 from a retreat position (see FIG. 1) to below the recording unit 9.

(Ink Push-Out Operation)

Figure 8:
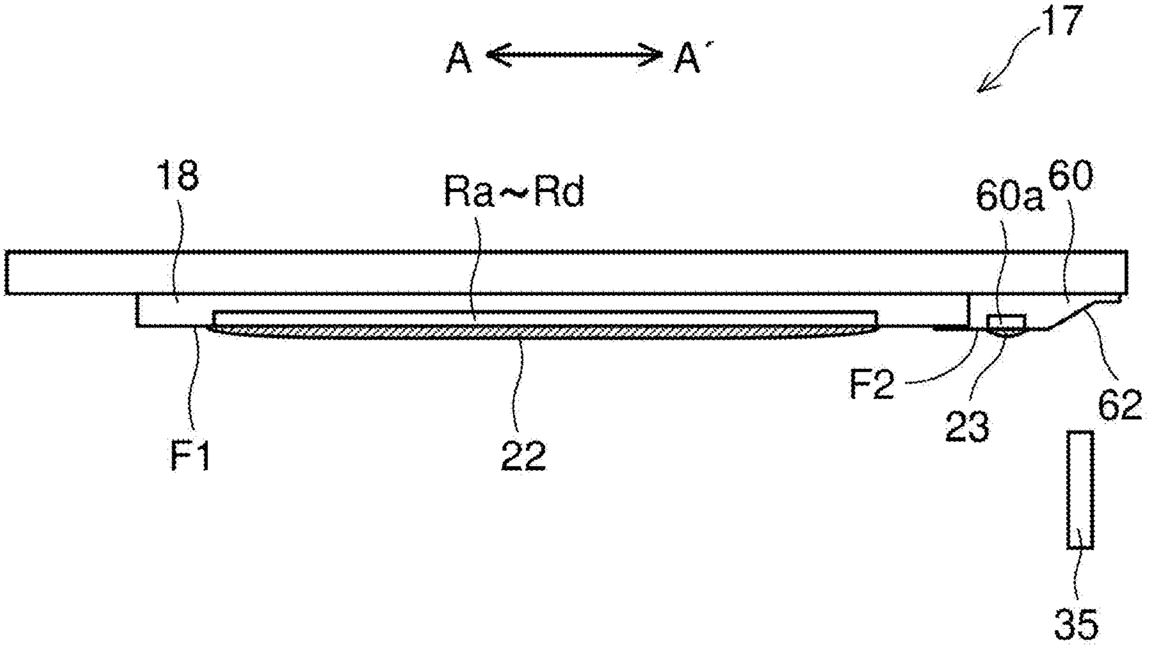
FIG. 8 is a side view illustrating a state where a wiper is disposed below the recording head.

Prior to a wiping operation (described later), the ink is supplied to the recording head 17 by a control signal from the control unit 110 (see FIG. 1). As illustrated in FIG. 8, the supplied ink is forcibly pushed out (purged) as purge ink 22 from the nozzles 18*a*. By this purge operation, thickened ink, foreign objects, and bubbles in the nozzles 18*a* are discharged, so that the recording head 17 can be recovered.

(Cleaning Liquid Supply Operation)

In addition, prior to the wiping operation, the cleaning liquid is supplied to the recording head 17 by a control signal from the control unit 110. As illustrated in FIG. 8, cleaning liquid 23 is supplied from the cleaning liquid supply port 60*a* to the cleaning liquid supply surface F2 by a predetermined amount.

(Wiping Operation)

Figure 9:
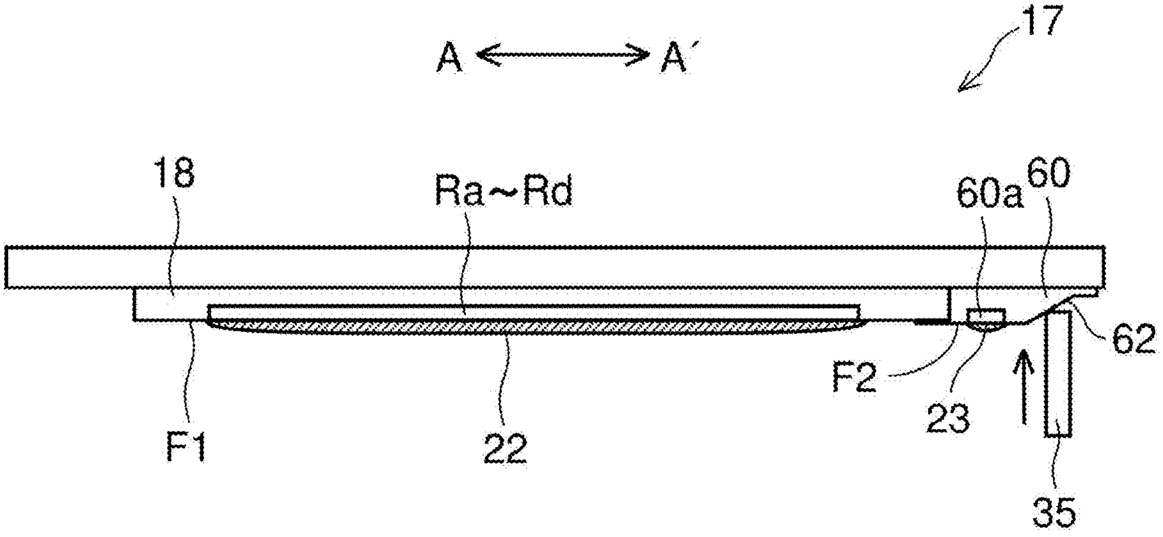
FIG. 9 is a side view illustrating a state where the wiper is moved upward from the state of FIG. 8, so as to contact and press the cleaning liquid supply member.

As illustrated in FIG. 9, a unit lifting mechanism (not shown) moves the maintenance unit 19 upward, and hence a wiper 35 contacts the inclined surface 62 of the cleaning liquid supply member 60 of the recording head 17 with a predetermined pressure.

The wiper 35 is an elastic member (a member made of rubber such as EPDM) for wiping the purge ink 22 pushed out from the nozzles 18*a* of the recording head 17, and the cleaning liquid 23 supplied from the cleaning liquid supply port 60*a*. The wiper 35 is pressed to contact a part of the cleaning liquid supply member 60 on the upstream side of the wiping direction (the inclined surface 62), and wipes the cleaning liquid supply surface F2 and the ink ejection surface F1 in a predetermined direction (arrow A direction), when a carriage (not shown) moves.

Figure 10:
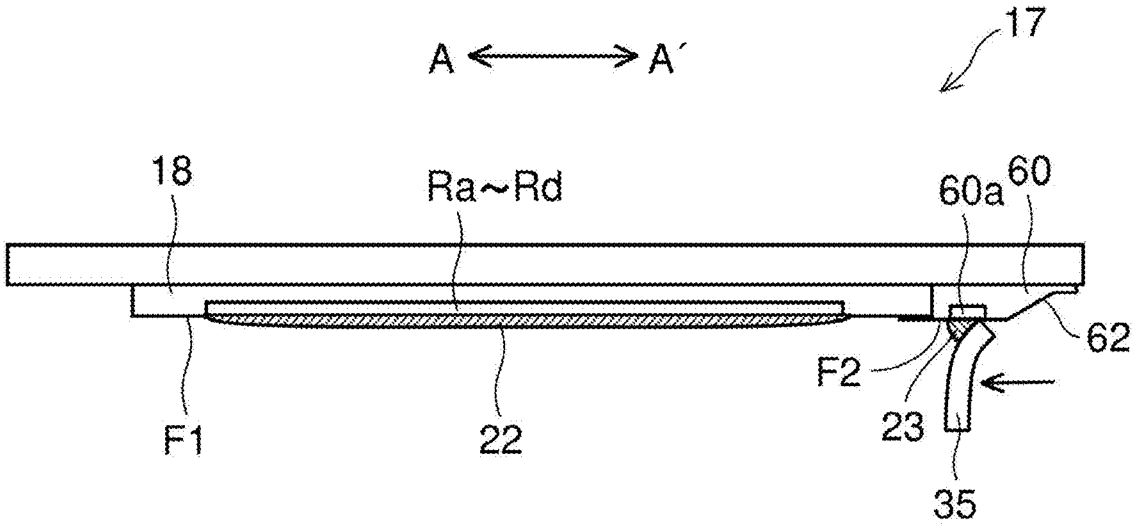
FIG. 10 is a side view illustrating a state where the wiper is moved from the state of FIG. 9 in an arrow A direction while contacting and pressing the cleaning liquid supply member.

The wiper 35 is moved along the cleaning liquid supply surface F2 toward a nozzle region Ra to Rd (in the arrow A direction) from the state where the tip of the wiper 35 is pressed to contact the inclined surface 62 of the cleaning liquid supply member 60. In this way, as illustrated in FIG. 10, the wiper 35 wipes off the cleaning liquid 23 and then moves toward the nozzle regions Ra to Rd in the state holding the cleaning liquid 23.

Figure 11:
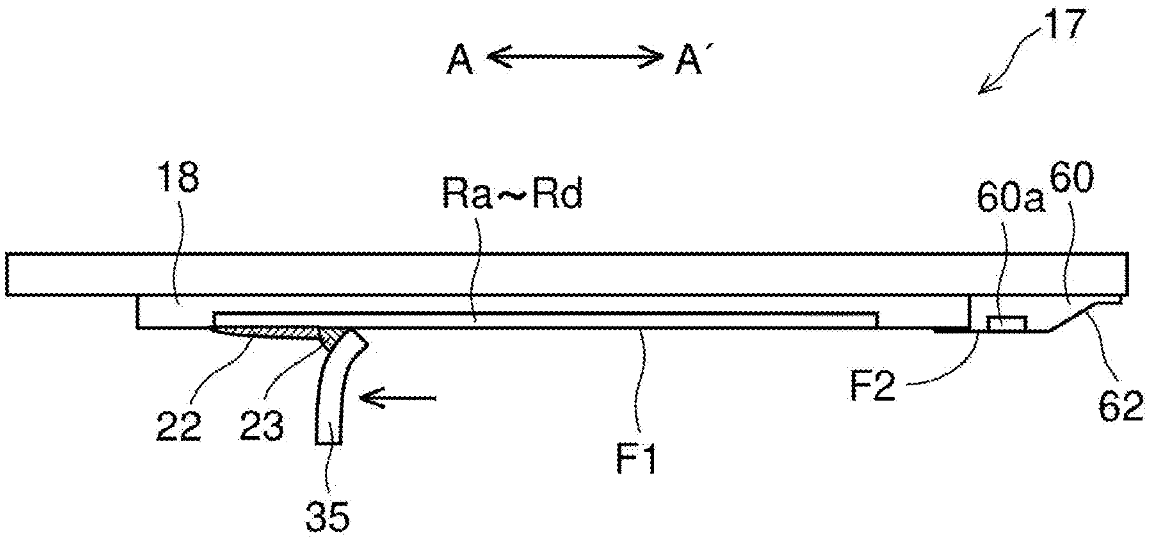
FIG. 11 is a side view illustrating a state where the wiper is moved further in the arrow A direction from the state of FIG. 10.

Then, as illustrated in FIG. 11, the wiper 35 moves on the ink ejection surface F1 to the left side (in the arrow A direction), while keeping the state holding the cleaning liquid 23 and the purge ink 22. In this case, the ink drops adhered and solidified on the ink ejection surface F1 are swelled and dissolved by the cleaning liquid 23 and the purge ink 22, and are wiped off by the wiper 35. Then, the wiper 35 further moves to the left (in the arrow A direction), and when it reaches an end opposite to the cleaning liquid supply member 60 with respect to the nozzle region Ra to Rd, the movement to the left is stopped. The cleaning liquid 23 and the purge ink 22 wiped off by the wiper 35 are collected onto a waste ink collection tray (not shown), which is disposed in the maintenance unit 19.

(Separating Operation)

Figure 12:
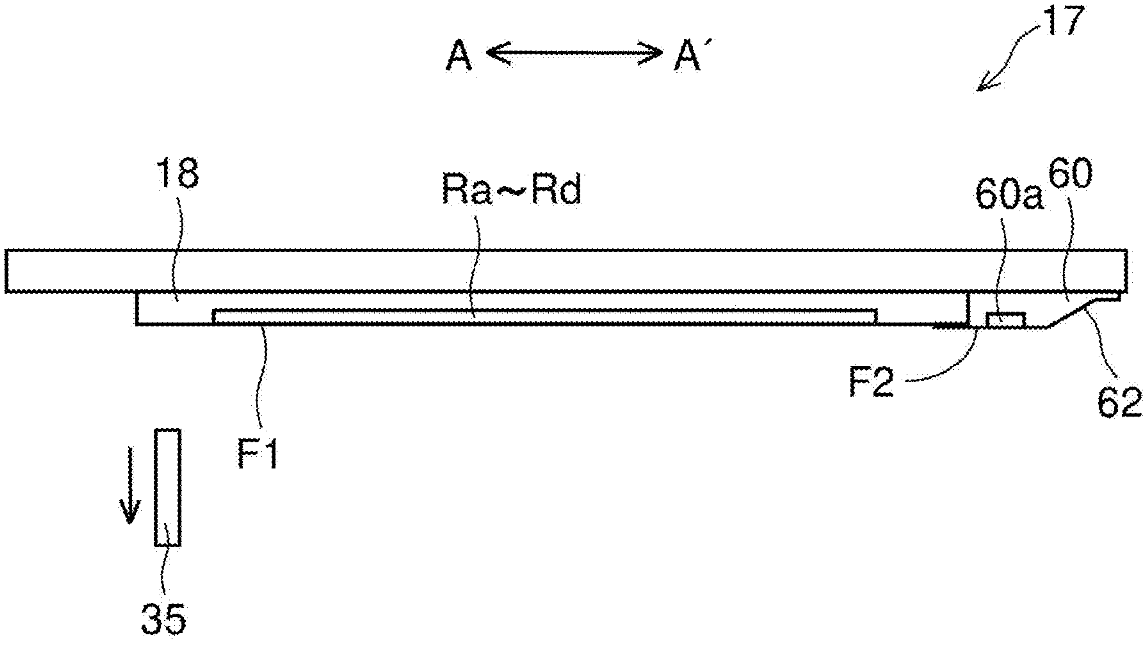
FIG. 12 is a side view illustrating a state where the wiper is moved further in the arrow A direction from the state of FIG. 11, and then the wiper is moved downward so as to separate from the ink ejection surface.

After execution of the wiping operation, as illustrated in FIG. 12, the wiper 35 is moved downward to separate from the ink ejection surface F1. After that, the maintenance unit 19 disposed between the recording unit 9 and the first conveying unit 5 is moved horizontally to the retreat position below the second conveying unit 12, and the first conveying unit 5 is moved upward to a predetermined position. In this way, the recovery operation of the recording head 17 is finished.

As described above, after supplying the cleaning liquid 23 from the cleaning liquid supply port 60*a*, the wiper 35 is moved along the ink ejection surface F1 from the upstream side of the cleaning liquid supply port 60*a* in the wiping direction, and hence the wiper 35 can wipe the ink ejection surface F1 while holding the cleaning liquid 23.

In this way, ink drops adhered and solidified on the ink ejection surface F1 can be swelled and dissolved by the cleaning liquid 23, and can be wiped off, so that the ink ejection surface F1 can be cleaned easily and securely. In addition, the cleaning liquid 23 improves lubricity between the ink ejection surface F1 and the wiper 35, and hence the water repellent film on the ink ejection surface F1 is effectively prevented from coming off due to friction with the wiper 35.

Further, as the cleaning liquid 23 is wiped off by the wiper 35 together with the purge ink 22, the cleaning liquid can remain on the ink ejection surface F1 after wiping. In this way, occurrence of deterioration in straightness of the ink (flying astray), ejection failure, or the like can be suppressed for a long period of time so that image quality can be maintained, and drying of ink drops and mist adhered onto the ink ejection surface F1 can be suppressed.

(Cleaning Liquid Applying Operation)

It may be possible to add an operation of applying the cleaning liquid 23 onto the ink ejection surface F1, to the recovery operation of the recording head described above. Specifically, after the wiping operation, the cleaning liquid 23 is supplied again from the cleaning liquid supply port 60*a* to the cleaning liquid supply surface F2 by a predetermined amount. Then, the wiper 35 is moved to the upstream side in the wiping direction so as to contact and press the inclined surface 62, and is moved along the cleaning liquid supply surface F2 in the arrow A direction, so that the wiper 35 can hold the cleaning liquid 23. In this state, the wiper 35 is moved along the ink ejection surface F1 in the arrow A direction. In this way, the cleaning liquid 23 is uniformly applied to the ink ejection surface F1. After the operation of applying the cleaning liquid 23, the wiper 35 is moved downward so as to separate from the ink ejection surface F1.

By just wiping the purge ink 22 with the cleaning liquid 23, the cleaning liquid 23 containing the ink may remain on the ink ejection surface F1. Therefore, by the operation of applying the cleaning liquid 23, only the cleaning liquid 23 can be applied to the ink ejection surface F1. In this way, drying of the ink ejection surface F1 is suppressed, and further, after applying the cleaning liquid 23, drying and solidification of ink drops and mist adhered to the ink ejection surface F1 can be effectively suppressed.

Other than that, the present disclosure is not limited to the embodiment described above, but can be variously modified within the scope of the present disclosure without deviating from the spirit thereof.

The present disclosure can be used in inkjet recording apparatuses including nozzles for ejecting aqueous ink to a recording medium. Using the present disclosure, it is possible to provide an inkjet recording apparatus that can improve ink ejection failure by removing and dissolving ink adhered and solidified on a nozzle surface of a recording head, and a method for cleaning the recording head.

What is claimed is:

1. A liquid supply mechanism comprising:

a tank configured to store liquid;

a supply passage having an end connected to the tank so as to allow the liquid to flow; and an ejection member disposed on the supply passage so as to eject the liquid, wherein the ejection member includes a filter having a predetermined passage resistance to the passing liquid, a check valve configured to be opened at a predetermined opening pressure for the passing liquid, and an ejection passage configured to allow the liquid to flow when the check valve is opened and to eject the liquid from an ejection port formed at a tip thereof, and a pressure decompressed by the passage resistance of the filter is larger than the opening pressure of the check valve.

2. The liquid supply mechanism according to claim 1, wherein the pressure decompressed by the passage resistance of the filter is three times or more the opening pressure of the check valve.

3. The liquid supply mechanism according to claim 1, wherein the opening pressure of the check valve is higher than the pressure decompressed by the passage resistance in the supply passage from the downstream of the ejection member to the tank, and the sum of the passage resistances until reaching the ejection port in the ejection passage, which includes the pressure decompressed by the passage resistance of the filter and the opening pressure of the check valve, is twice or more the passage resistance of the supply passage from the downstream of the ejection member to the tank.

4. The liquid supply mechanism according to claim 1, wherein the supply passage is branched into a plurality of supply passages, and the ejection member is disposed on each of the branched supply passages.

5. The liquid supply mechanism according to claim 4, further comprising an on-off valve disposed on the downstream side of the ejection member, the on-off valve being capable of opening and closing the supply passage of the liquid.

6. The liquid supply mechanism according to claim 5, wherein the plurality of branched supply passages join at a confluence part on the downstream side of the ejection member, and the on-off valve is disposed on the downstream side of the confluence part of the supply passage.

7. The liquid supply mechanism according to claim 6, wherein both ends of the supply passage are connected to the pump configured to circulate the liquid.

8. An inkjet recording apparatus comprising:

the liquid supply mechanism according to claim 1;

a recording head having an ink ejection surface provided with ink ejection ports configured to eject ink;

a wiper member configured to contact the ink ejection surface and to move in a predetermined wiping direction, so as to wipe the ink ejection surface;

a cleaning liquid supply unit disposed on the upstream side of the ink ejection surface in the wiping direction, the cleaning liquid supply unit including a cleaning liquid supply surface provided with ejection ports configured to supply cleaning liquid to be used by the wiper member for wiping the ink ejection surface;

a drive unit configured to apply a force to move the cleaning liquid in the supply passage and to push out the cleaning liquid from the ejection port; and a control unit configured to control a cleaning operation in which the wiper member wipes the ink ejection surface using the cleaning liquid, wherein the tank configured to store the cleaning liquid;

the supply passage configured to guide the cleaning liquid from the tank to the cleaning liquid supply unit;

the supply passage is branched to form a plurality of branched supply passages, and the ejection member is disposed on each of the branched supply passages.

* * * * *